United States Patent
Jones

(10) Patent No.: US 12,096,402 B2
(45) Date of Patent: Sep. 17, 2024

(54) FREQUENCY BAND SELECTION FOR INTEGRATED ACCESS AND BACKHAUL (IAB) IN WIRELESS COMMUNICATION NETWORKS

(71) Applicant: T-Mobile Innovations LLC, Overland Park, KS (US)

(72) Inventor: David Charles Jones, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 450 days.

(21) Appl. No.: 17/562,543

(22) Filed: Dec. 27, 2021

(65) Prior Publication Data

US 2023/0209506 A1 Jun. 29, 2023

(51) Int. Cl.
| | | |
|---|---|---|
| *H04W 72/02* | (2009.01) | |
| *H04W 72/0453* | (2023.01) | |
| *H04W 72/27* | (2023.01) | |
| *H04W 72/51* | (2023.01) | |
| *H04W 72/541* | (2023.01) | |
| *H04W 72/542* | (2023.01) | |

(52) U.S. Cl.
CPC ....... *H04W 72/02* (2013.01); *H04W 72/0453* (2013.01); *H04W 72/27* (2023.01); *H04W 72/51* (2023.01); *H04W 72/541* (2023.01); *H04W 72/542* (2023.01)

(58) Field of Classification Search
CPC . H04W 72/02; H04W 72/0453; H04W 72/27; H04W 72/51; H04W 72/541; H04W 72/542; H04W 48/16; H04W 64/00; H04W 16/14

USPC .......................................... 370/310, 328, 329
See application file for complete search history.

(56) References Cited

U.S. PATENT DOCUMENTS

| | | | |
|---|---|---|---|
| 10,206,232 B2 | 2/2019 | Novlan et al. | |
| 10,785,699 B2 | 9/2020 | Sirotkin et al. | |
| 10,986,644 B2 | 4/2021 | Luo et al. | |
| 2005/0255879 A1* | 11/2005 | Shi ........................ | H04W 60/06 455/552.1 |
| 2015/0172931 A1* | 6/2015 | Jose ...................... | H04W 16/14 370/329 |
| 2019/0053183 A1 | 2/2019 | Park et al. | |

(Continued)

FOREIGN PATENT DOCUMENTS

| | | |
|---|---|---|
| WO | 2020056748 A1 | 3/2020 |
| WO | 2020093333 A1 | 5/2020 |
| WO | 2021027817 A1 | 2/2021 |

*Primary Examiner* — Obaidul Huq

(57) ABSTRACT

An Integrated Access and Backhaul (IAB) Mobile Terminal (MT) identifies its geographic location and determines a New Radio Licensed (NR-L) frequency band and a New Radio Unlicensed (NR-U) frequency band based on the location. The IAB MT determines received signal strengths for the frequency bands. The IAB MT compares the received signal strengths to and select the NR-U frequency band. The IAB MT wirelessly exchanges network signaling over the NR-U frequency band and establishes an IAB link over the NR-U frequency band. A Radio Unit (RU) wirelessly exchanges user data with wireless User Equipment (UEs) and exchanges the user data with a Distributed Unit (DU). The DU exchanges the user data with the IAB MT. The IAB MT wirelessly exchanges the user data over the IAB link using the NR-U frequency band.

20 Claims, 9 Drawing Sheets

(56) References Cited

U.S. PATENT DOCUMENTS

| | | |
|---|---|---|
| 2020/0045563 A1 | 2/2020 | Luo et al. |
| 2020/0288409 A1* | 9/2020 | Li ........................ H04B 7/0626 |
| 2021/0058826 A1 | 2/2021 | Mao et al. |
| 2021/0160703 A1 | 5/2021 | Luo et al. |

* cited by examiner

BACKHAUL ADAPTION PROTOCOL (BAP) 506 DATA STRUCTURE 800

| SECTOR | SCAN #1 | | | | SCAN #2 | | | | ... | SCAN #N | | | |
|---|---|---|---|---|---|---|---|---|---|---|---|---|---|
| | FREQ | CELL ID | NR-U OFFSET | HYS | FREQ | CELL ID | NR-L OFFSET | HYS | | FREQ | CELL ID | NR-U OFFSET | HYS |
| A | A1 | A2 | A3 | A4 | A5 | A6 | A7 | A8 | | A9 | A10 | A11 | A12 |
| B | B1 | B2 | B3 | B4 | B5 | B6 | B7 | B8 | | B9 | B10 | B11 | B12 |
| ... | | | | | | | | | | | | | |
| N | N1 | N2 | N3 | N4 | N5 | N6 | N7 | N8 | | N9 | N10 | N11 | N12 |

FIGURE 8

FREQUENCY BAND SELECTION FOR INTEGRATED ACCESS AND BACKHAUL (IAB) IN WIRELESS COMMUNICATION NETWORKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network. In another example, a vehicle may execute a navigation application that communicates with a direction server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). For 5GNR, the Federal Communications Commission (FCC) licenses several frequency bands (NR-L) at significant cost to the licensee. For 5GNR, the FCC also allows the free and unlicensed use of several frequency bands (NR-U). The wireless access nodes that use the NR-U bands typically feature high-bandwidth but have significant power limitations.

The NR-U frequency bands are unlicensed and shared, so the wireless user devices use Listen Before Talk (LBT) to first verify that no other devices are using an NR-U channel in the NR-U band before using the NR-U channel. If another device is using the NR-U channel, then wireless user device backs-off and tries another LBT attempt later. The service quality over the NR-U frequency bands is not guaranteed and degrades during periods of heavy use. The wireless communication networks often use the NR-U bands to supplement their licensed radio bands. The wireless communication networks may avoid using NR-U bands for real-time services like voice calling. The wireless communication networks may use the NR-U bands along with Licensed Assisted Access (LAA), Wireless Fidelity (WIFI), and other technologies.

The wireless access nodes exchange network signaling and user data with network elements that are often clustered together in network cores. The wireless network elements comprise Access and Mobility Management Functions (AMFs), Session Management Functions (SMFs), and the like. Some of the network elements like User Plane Functions (UPFs) are grouped into wireless network slices that deliver data services like massive Machine Type Communications (mMTC), Ultra-Reliable Low-Latency Communications (URLLC), and enhanced Mobile Broadband (eMBB).

Some wireless access nodes comprise a Radio Unit (RU), Distributed Unit (DU), and Centralized Unit (CU). The RU is often mounted on a tower and wirelessly communicates with the wireless user devices. The RU communicates with the DU which communicates with the CU—typically over metallic or optical cabling. The CU communicates with the network core. To improve reliability and range, the wireless access nodes implement Integrated Access and Backhaul (IAB) where the DUs wirelessly connect to the CUs over other RUs and DUs. To use IAB, a DU is configured with an IAB Mobile Terminal (MT). The IAB MT serves the DU and operates like a wireless user device to connect to other RUs and DUs for backhaul.

IAB MTs link the DUs over their wireless IAB links. Unfortunately, the IAB MTs do not efficiently select frequency bands for the IAB links based on comparative signal strength. Moreover, the IAB MTs do not effectively support mobility for IAB MTs and DUs.

TECHNICAL OVERVIEW

An Integrated Access and Backhaul (IAB) Mobile Terminal (MT) identifies its geographic location and determines a New Radio Licensed (NR-L) frequency band and a New Radio Unlicensed (NR-U) frequency band based on the location. The IAB MT determine received signal strengths for the frequency bands. The IAB MT compares the received signal strengths to and select the NR-U frequency band. The IAB MT wirelessly exchanges network signaling over the NR-U frequency band and establishes an IAB link over the NR-U frequency band. A Radio Unit (RU) wirelessly exchanges user data with wireless User Equipment (UEs) and exchanges the user data with a Distributed Unit (DU). The DU exchanges the user data with the IAB MT. The IAB MT wirelessly exchanges the user data over the IAB link using the NR-U frequency band.

DESCRIPTION OF THE DRAWINGS

FIG. 8 illustrates an exemplary operation of the 5G wireless communication network to serve the wireless UEs over IAB.

DETAILED DESCRIPTION

Figure 1:
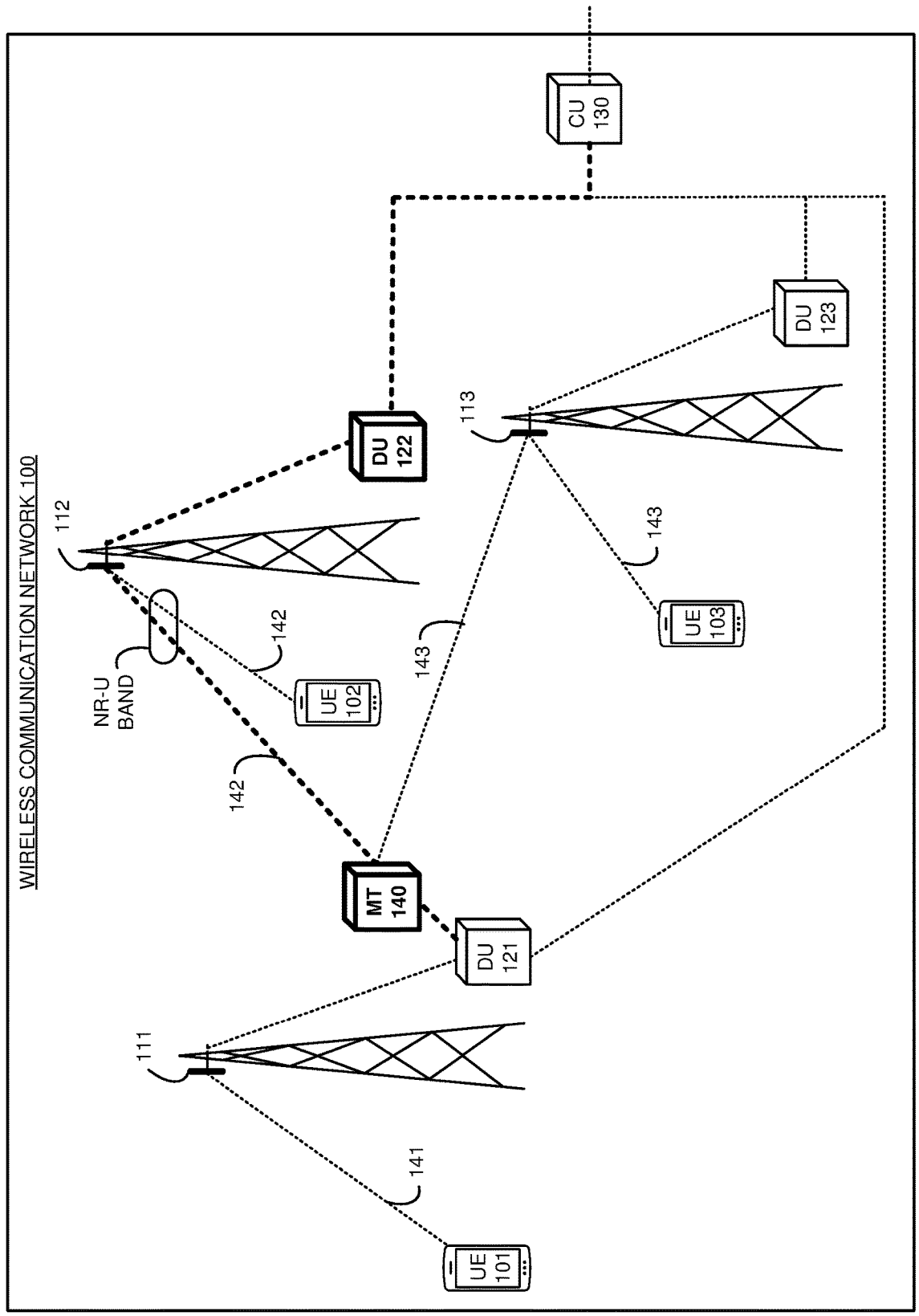
FIG. 1 illustrates an exemplary wireless communication network that serves wireless User Equipment (UEs) over Integrated Access and Backhaul (IAB).

FIG. 1 illustrates an exemplary wireless communication network 100 that serves wireless User Equipment (UE) 101 over Integrated Access and Backhaul (IAB). Wireless communication network 100 comprises UEs 101-103, Radio Units (RUs) 111-113, Distributed Units (DUs) 121-123, Centralized Unit (CU) 130, and IAB Mobile Terminal (MT) 140. UEs 101-103 comprises computers, phones, vehicles, sensors, robots, or some other data appliances with wireless communication circuitry. UEs 101-103 and respective RUs 111-113 wirelessly communication over respective radio bands 141-143. Radio band 142 comprises a New Radio Unlicensed (NR-U) frequency band, and radio band 143 comprises a New Radio Licensed (NR-L) frequency band. Radio band 141 could be NR-U, NR-L, or use some other type of wireless frequency. Wireless communication network 100 is simplified for clarity and typically includes far more UEs, RUs, DUs, CUs, and MTs.

Various examples of network configuration and operation are described herein. In some examples, IAB MT 140 identifies its geographic location and determines NR-U frequency band 142 and NR-L frequency band 143 based on the geographic location. For example, MT 140 may host a data structure that correlates geographic network sectors in wireless communication network 100 with an ordered list of scanning frequencies and instructions. IAB MT 140 scans NR-U frequency band 142 and NR-L frequency band 143 and determines Received Signal Strengths (RSS) for the NR-U frequency band 142 and NR-L frequency band 143. IAB MT 140 compares the RSS for NR-U frequency band 142 and NR-L frequency band 143. IAB MT 140 and selects NR-U frequency band 142 based on the comparison. For example, an IAB Backhaul Adaption Protocol (BAP) in IAB MT 140 may apply interference and other offsets to the RSS to select NR-U frequency band 142 because band 142 has the best RSS for IAB after the offsets are applied. IAB MT 140 wirelessly exchanges network signaling with a donor access node over NR-U frequency band 142—where the donor access node comprises RU 112, DU 122, and CU 130. IAB MT 140 establishes an IAB link with the DU 122 over NR-U frequency band 142 and RU 112. UE 101 and RU 111 wirelessly exchanges user data. RU 111 and DU 121 exchange the user data. DU 121 and IAB MT 140 exchange the user data. IAB MT 140 and the DU 122 wirelessly exchange the user data over the IAB link using NR-U frequency band 142 and RU 112. DU 122 exchanges the user data with CU 130 which exchanges the user data with external systems. In some examples, RU 111, DU 121, and MT 140 comprise a 5GNR gNodeB. In some examples, the donor access node (RU 112, DU 122, and CU 130) comprise a 5GNR gNodeB.

Advantageously, IAB MT 140 efficiently selects NR-U frequency bands for IAB links based on comparative signal strength with NR-L frequency bands. Moreover, IAB MT 140 effectively supports mobility for IAB MT 140 and/or DUs 121-123.

The network elements of wireless communication network 100 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, virtual switching, inter-processor communication, bus interfaces, and/or some other data communication protocols. UEs 101-103, RUs 111-113, and IAB MT 140 comprise radios. UEs 101-103, RUs 111-113, DUs 121-123, CU 130, and IAB MT 140 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
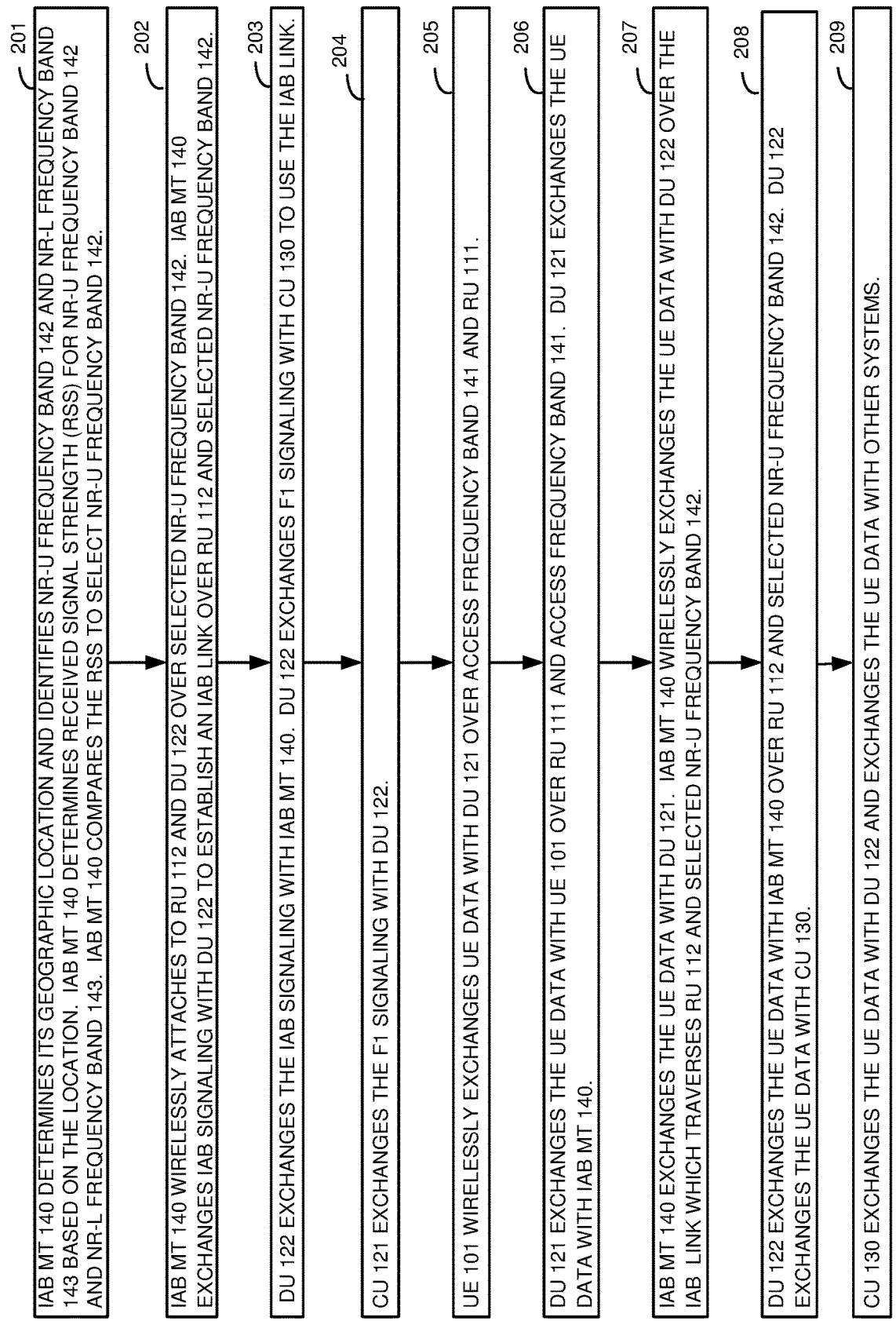
FIG. 2 illustrates an exemplary operation of the wireless communication network to serve the wireless UEs over IAB.

FIG. 2 illustrates an exemplary operation of wireless communication network 100 to serve wireless UE 101 over IAB. The operation may vary in other examples. IAB MT 140 determines its geographic location and identifies NR-U frequency band 142 and NR-L frequency band 143 based on the location (201). IAB MT 140 determines Received Signal Strength (RSS) for NR-U frequency band 142 and for NR-L frequency band 143 (201). IAB MT 140 compares the RSS to select NR-U frequency band 142 (201). IAB MT 140 wirelessly attaches to RU 112 and DU 122 over selected NR-U frequency band 142 (202). IAB MT 140 exchanges IAB signaling with DU 122 to establish an IAB link over RU 112 and selected NR-U frequency band 142 (202). DU 122 exchanges the IAB signaling with IAB MT 140 to establish the IAB link (203). DU 122 exchanges F1 signaling with CU 130 to use the IAB link (203). CU 130 exchanges the F1 signaling with DU 122 to use the IAB link (204). UE 101 wirelessly exchanges UE data with DU 121 over access frequency band 141 and RU 111 (205). DU 121 exchanges the UE data with IAB MT 140 (206). IAB MT 140 exchanges the UE data with DU 121 (207). IAB MT 140 wirelessly exchanges the UE data with DU 122 over the IAB link which traverses RU 112 and selected NR-U frequency band 142 (207). DU 122 exchanges the user data with IAB MT 140 and with CU 130 (208). CU 130 exchanges the UE data with DU 122 and exchanges the UE data with other systems like a network core (209).

Figure 3:
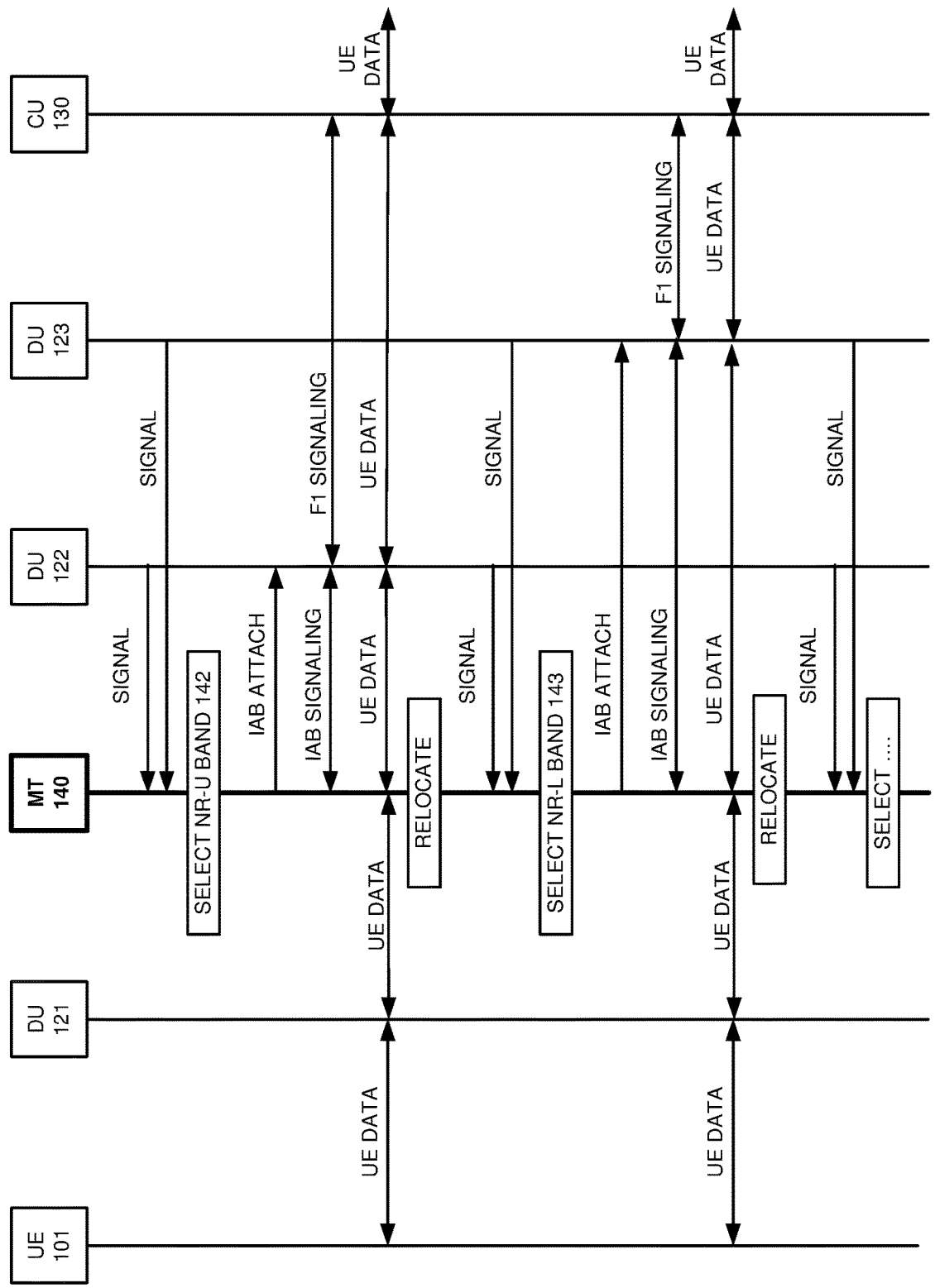
FIG. 3 illustrates an exemplary operation of the wireless communication network to serve the wireless UEs over IAB.

FIG. 3 illustrates an exemplary operation of wireless communication network to serve wireless UE 101 over IAB. The operation may vary in other examples. For clarity, RUs 111-113 are omitted from the discussion but would be present and operate as described above. IAB MT 140 uses its geographic location to identify NR-U frequency band 142 and NR-L frequency band 143. IAB MT 140 scans signals from NR-U frequency band 142 and NR-L frequency band 143. IAB MT 140 compares the RSS for frequency bands 142-143 and selects NR-U frequency band 142 as the best signal. IAB MT 140 attaches to DU 122 in the donor access node over NR-U frequency band 142. IAB MT 140 and DU 122 exchange IAB signaling to establish an IAB link over NR-U frequency band 142. DU 122 and CU 130 exchange F1 signaling to use the IAB link. UE 101 and DU 121 exchange UE data. DU 121 and IAB MT 140 exchange the UE data. IAB MT 140 and DU 122 exchange the UE data over the IAB link which traverses selected NR-U band 142. DU 122 and CU 130 exchange the UE data. CU 130 exchanges the UE data with other systems like a network core.

At this time, IAB MT 140 physically relocates. For example, RU 111, DU 121, and IAB MT 140 might be transported by an aerial-drone to an emergency site. IAB MT 140 uses its geographic location to identify NR-U frequency band 142 and NR-L frequency band 143. IAB MT 140 scans signals from NR-U frequency band 142 and NR-L frequency band 143. IAB MT 140 compares the RSS for frequency bands 142-143 and selects NR-U frequency band 143 as the best signal. IAB MT 140 wirelessly attaches to DU 123 over NR-L frequency band 143. IAB MT 140 and DU 123 exchange IAB signaling to establish an IAB link over NR-U frequency band 143. DU 123 and CU 130 exchange F1 signaling to use the IAB link. UE 101 and DU 121 exchange UE data. DU 121 and IAB MT 140 exchange the UE data. IAB MT 140 and DU 123 exchange the UE data over the IAB link that traverses selected NR-L band 143. DU 123 and CU 130 exchange the UE data. CU 130 exchanges the UE data with other systems like a network core. IAB MT 140 physically relocates again, and the frequency band selection process repeats.

Figure 4:
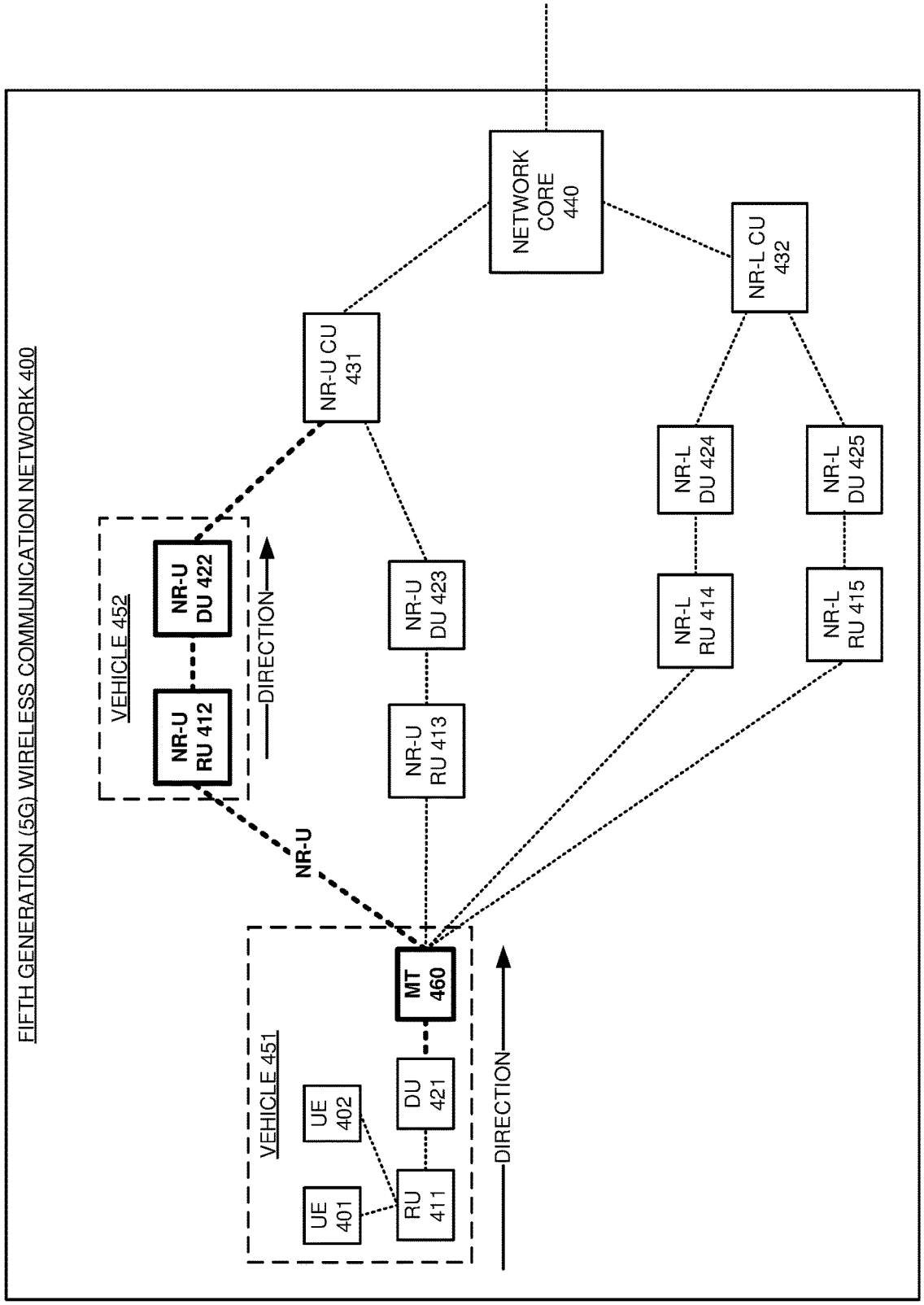
FIG. 4 illustrates an exemplary Fifth Generation (5G) wireless communication network that serves wireless UEs over IAB.

FIG. 4 illustrates an exemplary Fifth Generation (5G) wireless communication network that serves wireless UEs 401-402 over IAB. 5G wireless communication network 400 comprises an example of wireless communication network 100, although network 100 may differ. 5G wireless communication network 400 comprises: UEs 401-402, RUs 411-415, DUs 421-425, CUs 431-432, network core 440, and IAB MT 460. Vehicle 451 transports UEs 401-402, RU 411, DU 421, and IAB MT 460. Vehicle 452 transports RU 412 and DU 422. RUs 412-413, DUs 422-423, and CU 431 use or support NR-U frequency bands. RUs 414-415, DUs 424-425, and CU 432 use or support NR-L frequency bands. 5G wireless communication network 400 is simplified for clarity and typically comprises more UEs, RUs, DUs, MTs, and CUs than shown.

IAB MT 460 determines its geographic location through a network broadcast, satellite positioning, radio triangulation, or some other technique. IAB MT 460 hosts a data structure that correlates geographic areas with lists of frequencies, node IDs, and instructions. RUs 412-415 may broadcast the lists for their geographic areas. IAB MT 460 translates its geographic location into NR-U frequency bands for RUs 412-413 and NR-L frequency bands for RUs 414-415. IAB MT 460 scans signals from the frequency bands to determine their RSS and to receive system broadcasts. The system broadcasts may indicate RSS offsets for individual frequency bands. The offsets may represent noise, load, power rating, or some other characteristic of the corresponding RU and frequency band. The offsets are typically reduced to decibel values that can be directly combined with the RSS decibel values like RSS and hysteresis are combined. IAB MT 460 sums the RSS, the offsets, and the hysteresis for the individual frequency bands and selects the frequency band with the highest decibel result. As vehicles 451-452 move about, the RSS values and the selected frequency band may change.

At a given time, IAB MT 460 selects the NR-U frequency band for NR-U RU 412. IAB MT 460 wirelessly attaches to NR-U DU 422 in vehicle 452 over NR-U RU 412 and the selected NR-U band. IAB MT 460 and NR-U DU-U 422 exchange IAB signaling to establish an IAB link over the selected NR-U frequency band and RU 412. NR-U DU 422 and NR-U CU 431 exchange F1 signaling to serve the IAB link with network connectivity. UEs 401-402 and DU 421 exchange UE data over RU 411 using 5GNR, wireless fidelity, bluetooth, or millimeter wave. DU 421 and IAB MT 460 exchange the UE data. IAB MT 460 and NR-U DU 422 exchange the UE data over NR-U RU 412 and the selected NR-U band. NR-U DU 422 and NR-U CU 431 exchange the UE data. NR-U CU 431 exchanges the UE data with network core 440. Network core 440 exchanges the UE data with external systems.

At another time, IAB MT 460 selects the NR-L frequency band for NR-L RU 415. IAB MT 460 wirelessly attaches to NR-L DU 415 over NR-L RU 415 and the selected NR-L band. IAB MT 460 and NR-L DU 425 exchange IAB signaling to establish an IAB link over the selected NL-U frequency band and RU 415. NR-L DU 425 and NR-L CU 432 exchange F1 signaling to serve the IAB link with network connectivity to core 440. UEs 401-402 and DU 421 exchange UE data over RU 411 using 5GNR, wireless fidelity, bluetooth, or millimeter wave. DU 421 and IAB MT 460 exchange the UE data. IAB MT 460 and NR-L DU 425 exchange the UE data over NR-L RU 415 and the selected NR-1 band. NR-L DU 423 and NR-L CU 432 exchange the UE data. NR-L CU 432 exchanges the UE data with network core 440. Network core 440 exchanges the UE data with external systems.

As vehicles 451-452 move around and/or network conditions change, IAB MT 460 searches the frequency bands based on geographic location and connects to DUs 423-425 over RUs 413-415. IAB MT 460 typically attempts to maintain two IAB links while in motion and perform make-before-break handovers from one DU to another.

Figure 5:
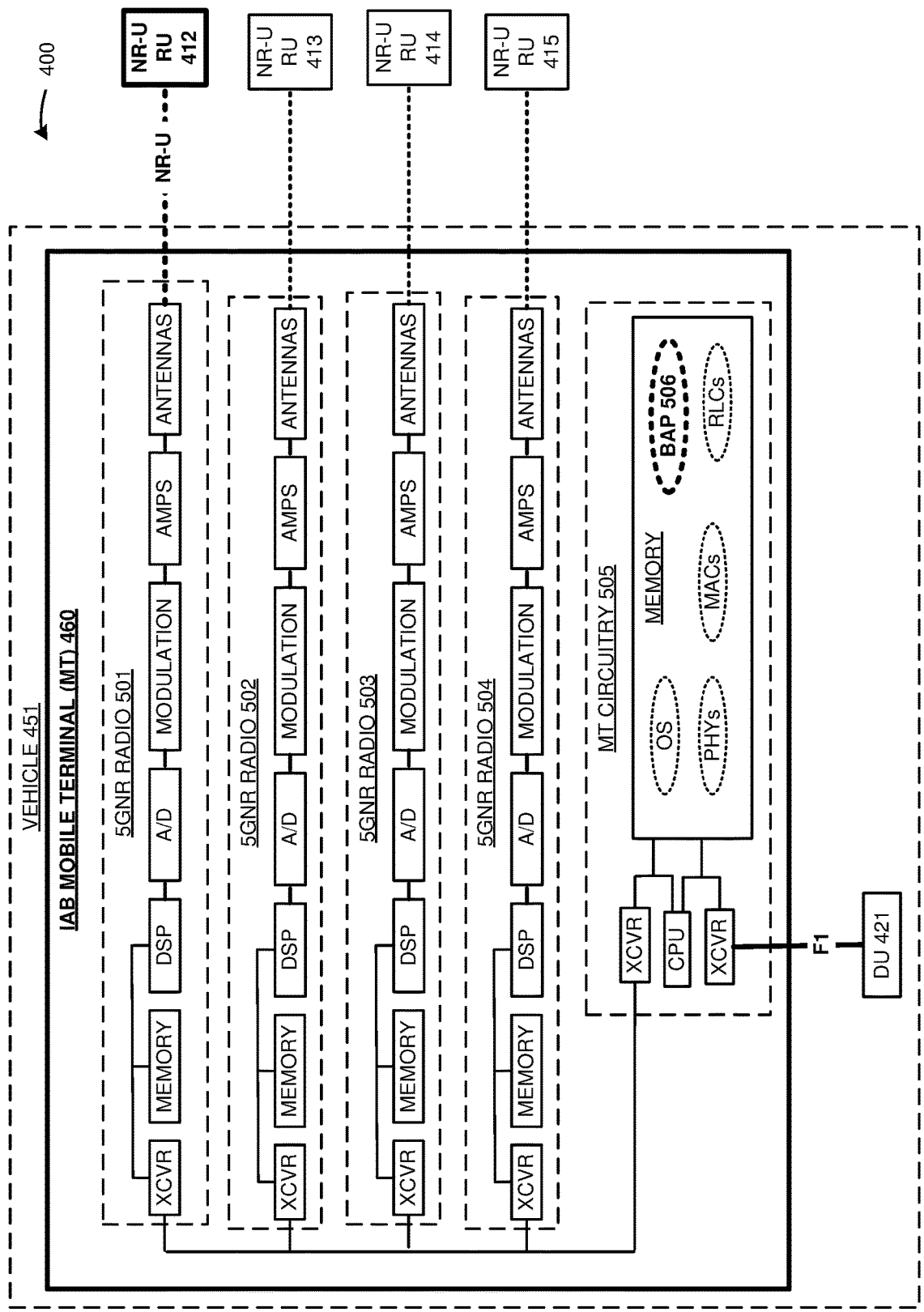
FIG. 5 illustrates an exemplary IAB Mobile Terminal (MT) in the 5G wireless communication network.

FIG. 5 illustrates exemplary IAB Mobile Terminal (MT) 460 in 5G wireless communication network 400. IAB MT 460 comprises an example of IAB MT 140, although MT 140 may differ. IAB MT 460 comprises 5GNR radios 501-504 and MT circuitry 505. Radios 501-504 comprise antennas, amplifiers, filters, modulation, analog-to-digital interfaces, DSP, memory, radio applications, and transceivers that are coupled over bus circuitry. MT circuitry 505 comprises memory, CPU, and transceivers that are coupled over bus circuitry. The memory stores an operating system (OS), and network applications for Physical Layers (PHYs), Media Access Control Layers (MACs), Radio Link Controls (RLCs), and Backhaul Adaption Protocol (BAP) 506. The antennas in 5GNR radios 501-504 are wirelessly coupled to RUs 412-415 over 5GNR links. Transceivers (XCVR) in radios 501-504 are coupled to transceivers in MT circuitry 505 Transceivers in MT circuitry 505 are coupled to DU 421 over an F1 link. The CPU in MT circuitry 505 executes the operating system, user applications, and network applications to exchange network signaling and user data with 5GNR RUs 412-415. In particular, BAP 506 selects RUs 412-415 based on their RSS and SIB data. BAP 506 couples UE data flows from the F1 link from DU 421 to IAB RLC channels that traverse selected RUs 412-415. For example, BAP 506 may select the NR-U band to RU 412 and couple the UE data flows from the F1 link from DU 421 to the RLC channels that traverse the NR-U band to RU 412.

Figure 6:
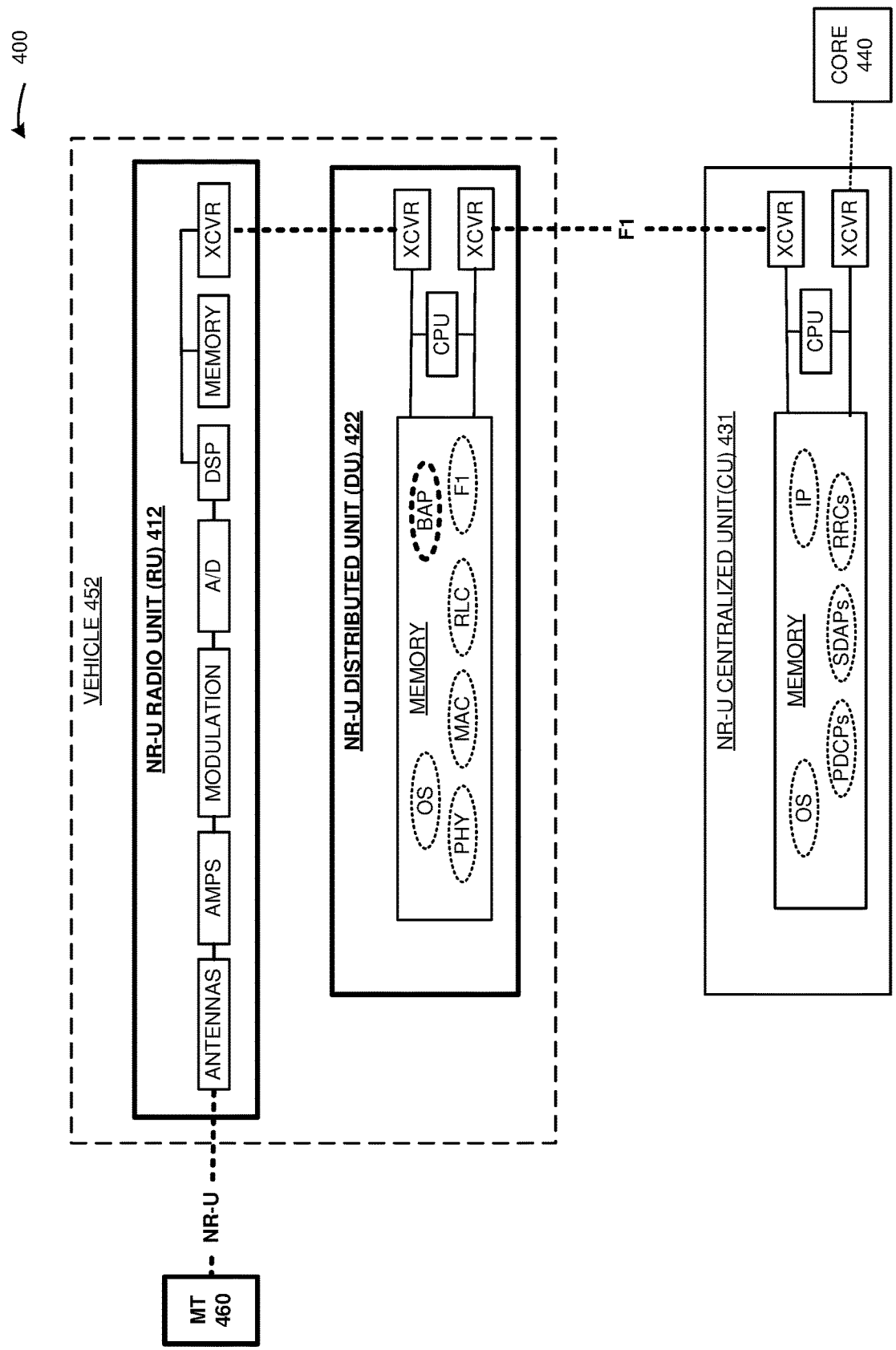
FIG. 6 illustrates an exemplary Radio Unit (RU), Distributed Unit (DU), and Centralized Unit (CU) in the 5G wireless communication network.

FIG. 6 illustrates exemplary Radio Unit (RU) 412, Distributed Unit (DU) 422, and Centralized Unit (CU) 431 in 5G wireless communication network 400. RU 412 comprises an example of RUs 111-113, 411, and 413-415, although these RUs may differ. DU 422 comprises an example of DUs 121-123, 421, and 423-425, although these DUs may differ. CU 431 comprises an example of CUs 130 and 432, although these CUs may differ. NR-U RU 412 comprises 5GNR antennas, amplifiers, filters, modulation, analog-to-digital interfaces, DSP, memory, radio applications, and transceivers that are coupled over bus circuitry. DU 422 comprises memory, CPU, and transceivers that are coupled over bus circuitry. The memory in DU 422 stores an operating system and network applications for PHY, MAC, RLC, BAP, and F1. CU 431 comprises memory, CPU, and transceivers that are coupled over bus circuitry. The memory in CU 431 stores an operating system, IP, and network applications for PDCP, SDAP, RRC, and IP. The antennas in RU 412 are wirelessly coupled to IAB MT 460 over a 5GNR link. Transceivers in RU 412 are coupled to transceivers in DU 422. Transceivers in DU 422 are coupled to transceivers in CU 431 over a wireless link like NR-U when vehicle 452 is in motion. Transceivers in CU 431 are coupled to network core 440. The DSP and CPU in RU 412, DU 422, and CU 431 execute operating systems, radio applications, and network applications to exchange network signaling and user data with IAB MT 460 and network core 440. In particular, the BAP in DU 422 couples UE data flows from the IAB RLC channels from IAB MT 460 with user data channels that traverse the F1 link to CU 431. In some examples, RU 412, DU 422, and CU 431 comprise a 5GNR gNodeB.

Figure 7:
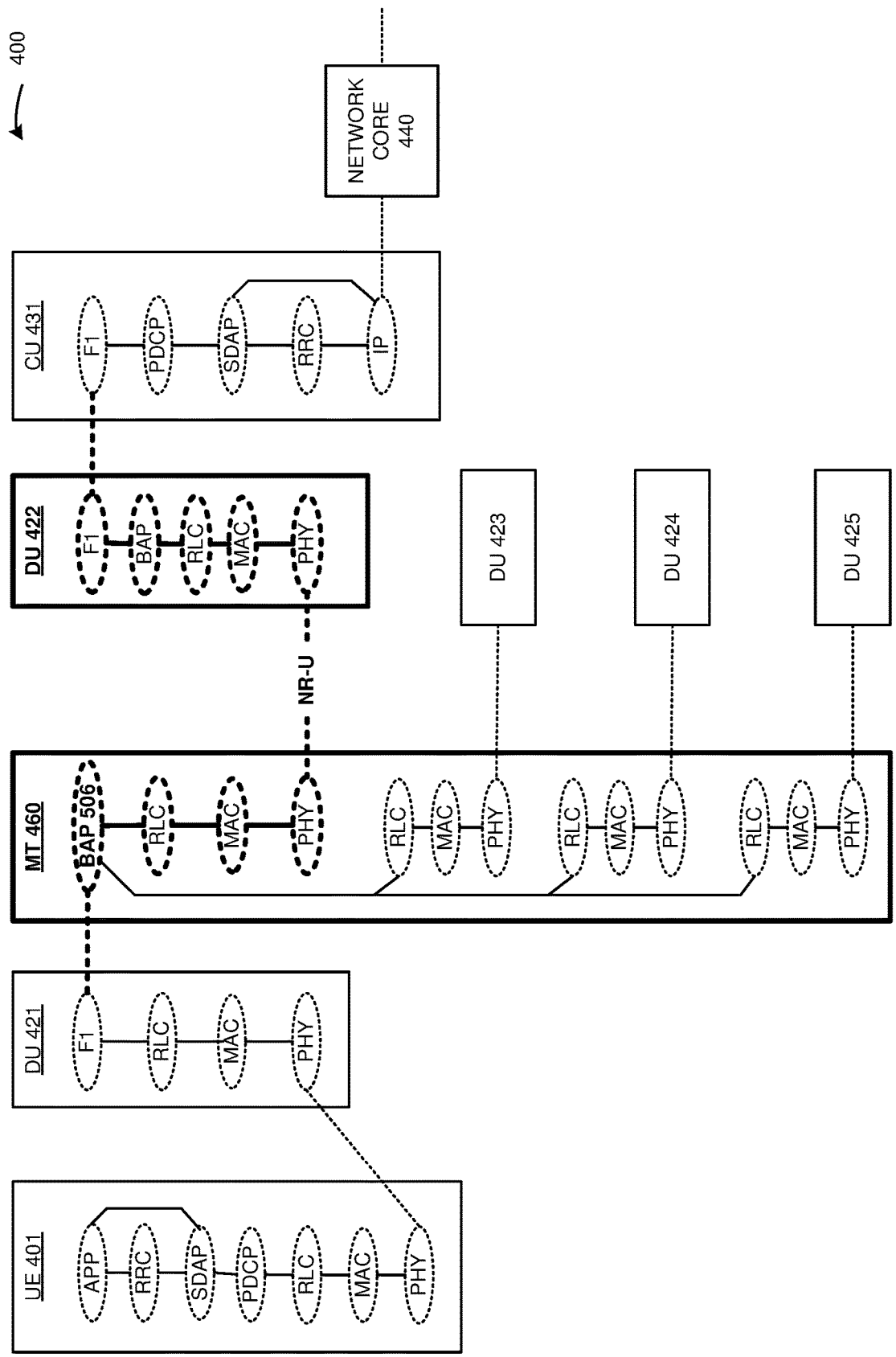
FIG. 7 illustrates an exemplary operation of the 5G wireless communication network to serve the wireless UEs over IAB.

FIG. 7 illustrates an exemplary operation of 5G wireless communication network 400 to serve wireless UEs 401-402 over IAB. The operation may vary in other examples. For clarity, RUs 411-415 are omitted from FIG. 7 but would be present and operate as described above. In IAB MT 460, BAP 506 identifies the geographic location of IAB MT 460 through a call to its operating system or some other technique. BAP 506 hosts a data structure that correlates geographic areas like network sectors with lists of frequencies, node IDs, and instructions.

In CU 431, the RRC drives a System Information Block (SIB) broadcast over DU 422 (and RU 412) that indicates offsets for NR-L, NR-U, interference, and the like. Another RRC in CU 431 (not shown) drives a similar SIB broadcast from DU 423 (and RU 413). The PHYs in IAB MT 460 scan the listed frequency bands for the node IDs per the instructions to determine RSS and SIB data. BAP 506 sums RSS and SIB offsets for the frequency bands to select the band that has the best resulting decibel level. For example, BAP 506 may sum RSS, interference offsets, NR-U offsets, and hysteresis for the frequency bands supported by DUs 422-425 to select the highest decibel level—DU 422 and its NR-U band in this example. BAP 506 initiates a random access procedure to the BAP in DU 422 over their RLCs, MACs, PHYs, RUs, and selected NR-U band. The BAP in DU 422 obtains connectivity to network core 440 over the F1 link to CU 431.

The RRC in UE 401 initiates a random access procedure to the RRC in CU 431 over the NR-U band, RUs, PHYs, MACs, RLCs, BAPs, F1s, and PDCPs. The RRC in UE 401 and the RRC in CU 431 exchange signaling over the NR-U band, RUs, PHYs, MACs, RLCs, BAPs, F1s, and PDCPs. The RRC in CU 431 and network core 440 exchange signaling to establish services for UE 401. The SDAP in UE 401 and the SDAP in CU 431 exchange user data over the NR-U band, RUs, PHYs, MACs, RLCs, BAPs, F1s, and PDCPs. The SDAP in CU 431 and network core 440 exchange the user data over IP links.

BAP 506 continues to receive RSS levels and SIB information over the various PHYs to derive comparative decibel levels for the various frequency bands. BAP 506 continues to select new frequency bands based on the comparative decibel levels. For example, DU 421 and IAB MT 460 may relocate near DU 425 to increase their RSS, and in response, BAP 460 selects and attaches to DU 425 (over RU 415) for IAB service.

FIG. 8 illustrates an exemplary operation of 5G wireless communication network 400 to serve wireless UEs 401-402 over IAB. The operation may vary in other examples. Data structure 800 which is hosted by Backhaul Adaption Protocol (BAP) 506 is depicted. The left column is entered with the serving network sector as the geographic location. The top two rows indicate attributes for radio scans #1-N like frequency and cell ID. The top two rows further indicate attributes for comparison of the radio scans like NR-U offset and hysteresis. The NR-U offsets may be derived from the SIBs and could relate to noise, power, or some other item that affects signal quality at an RU. For example, the NR-U offset may subtract a few decibels from an RSS when its RU is severely power restricted. In another example, the NR-L offset may add a few decibels to an RSS when its RU features an advanced antenna design. BAP 460 drives scans 1-N per the attribute values. BAP 460 compares the scan results per the attribute values to select the best frequency band—including the selection of NR-U bands based on NR-U offsets relayed to interference, power, and the like.

Figure 9:
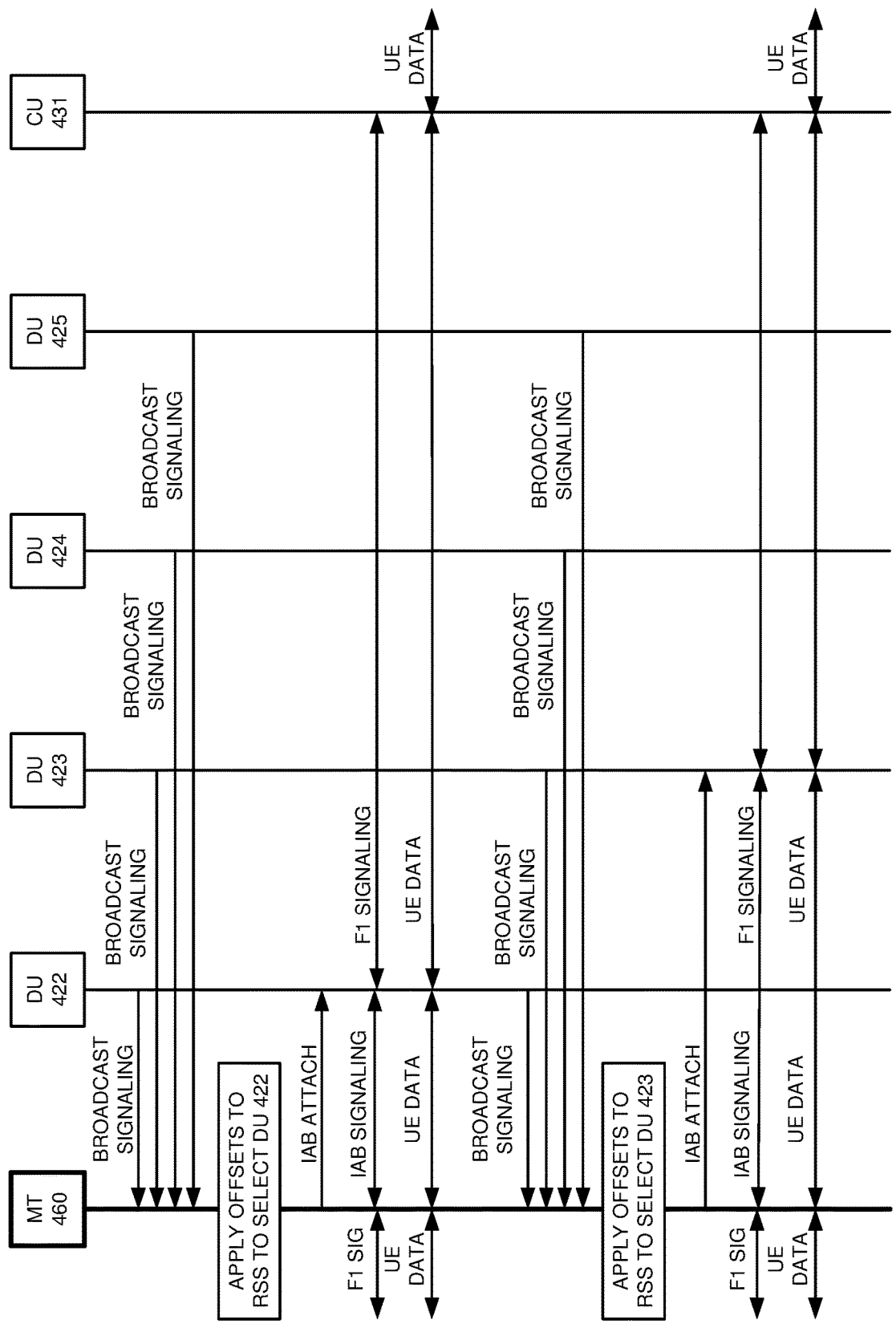
FIG. 9 illustrates an exemplary operation of the 5G wireless communication network to serve the wireless UEs over IAB.

FIG. 9 illustrates an exemplary operation of 5G wireless communication network 400 to serve wireless UEs 401-402 over IAB. The operation may vary in other examples. For clarity, RUs 411-415 are omitted from the discussion but would be present and operate as described above. IAB MT 460 uses its geographic location to scan frequency bands for their broadcast signaling. Based on the scans, IAB MT 460 compares the RSS for the frequency bands using offsets from the broadcast information to select the frequency band with the best signal. The NR-U band for DU 422 is selected in this example. IAB MT 460 wirelessly attaches to DU 422 over the selected NR-U frequency band and establishes IAB service. IAB MT 460 and DU 421 (not shown) exchange F1 signaling to establish network connections for UEs 401-402. IAB MT 460 and DU 422 exchange corresponding IAB signaling to establish the network connections for UEs 401-402. DU 422 and CU 431 exchange F1 signaling to establish the network connections for UEs 401-402. IAB MT 460 and DU 421 exchange UE data for UEs 401-402 over the F1 link. IAB MT 460 and DU 422 exchange the UE data over RLC channels in the IAB link. DU 422 and CU 431 exchange the UE data over their F1 link which now transports the F1 for DU 421. CU 431 exchanges the UE data with network core 440.

IAB MT 460 moves to a new geographic location and scan a new list of frequency bands for their broadcast signaling. IAB MT 460 compares the RSS for the frequency bands using offsets from the broadcast information to select the frequency band with the best signal—the NR-U band for DU 423 in this example. IAB MT 460 wirelessly attaches to DU 423 over the NR-U frequency band and establishes IAB service. IAB MT 460 and DU 421 (not shown) exchange F1 signaling to establish new network connections for UEs 401-402. IAB MT 460 and DU 423 exchange corresponding IAB signaling to establish the network connections for UEs 401-402. DU 423 and CU 431 exchange F1 signaling to establish the network connections for UEs 401-402. IAB MT 460 and DU 421 exchange UE data for UEs 401-402 over the F1 link. IAB MT 460 stops service over DU 422, and IAB MT 460 exchanges the UE data over RLC channels that traverse the IAB link to DU 423. DU 423 and CU 431 exchange the UE data over their F1 link that now transports the F1 for DU 421. CU 431 exchanges the UE data with network core 440.

The wireless data network circuitry described above comprises computer hardware and software that form special-purpose networking circuitry to serve wireless UEs over IAB. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve wireless UEs over IAB.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve wireless User Equipment (UEs) over Integrated Access and Backhaul (IAB), the method comprising:
    an IAB Mobile Terminal (MT) identifying its geographic location and determining at least a New Radio Licensed (NR-L) frequency band and a New Radio Unlicensed (NR-U) frequency band based on the geographic location;
    the IAB MT scanning the NR-L frequency band and the NR-U frequency band and determining received signal strengths for the NR-L frequency band and the NR-U frequency band;
    the IAB MT comparing the received signal strengths for the NR-L frequency band and the NR-U frequency band and selecting the NR-U frequency band based on the comparison;
    the IAB MT wirelessly exchanging network signaling with a donor access node over the NR-U frequency band and establishing an IAB link with the donor access node over the NR-U frequency band;
    a Radio Unit (RU) wirelessly exchanging user data with the wireless UEs and exchanging the user data with a Distributed Unit (DU);
    the DU exchanging the user data with the RU and exchanging the user data with the IAB MT; and
    the IAB MT wirelessly exchanging the user data with the donor access node over the IAB link using the NR-U frequency band.

2. The method of claim 1 wherein the IAB MT comparing the received signal strengths for the NR-L frequency band and the NR-U frequency band and selecting the NR-U frequency band based on the comparison comprises an IAB Backhaul Adaption Protocol (BAP) comparing the received signal strengths for the NR-L frequency band and the NR-U frequency band and selecting the NR-U frequency band based on the comparison.

3. The method of claim 1 wherein the IAB MT comparing the received signal strengths for the NR-L frequency band and the NR-U frequency band comprises applying an NR-U offset to the received signal strength for the NR-U frequency band.

4. The method of claim 1 wherein the IAB MT comparing the received signal strengths for the NR-L frequency band and the NR-U frequency band comprises applying an NR-L offset to the received signal strength for the NR-L frequency band.

5. The method of claim 1 further comprising:
    the IAB MT determining an interference level for the NR-U frequency band; and wherein
    the IAB MT selecting the NR-U frequency band based on the comparison comprises selecting the NR-U frequency band based on the comparison and the interference level for the NR-U frequency band.

6. The method of claim 1 wherein the Radio Unit (RU) wirelessly exchanging the user data with the wireless UEs comprises wirelessly exchanging the user data over another NR-U frequency band.

7. The method of claim 1 wherein the Radio Unit (RU) wirelessly exchanging the user data with the wireless UEs comprises wirelessly exchanging the user data over another NR-L frequency band.

8. The method of claim 1 wherein the wireless access node comprises a Fifth Generation New Radio (5GNR) gNodeB.

9. The method of claim 1 wherein the wireless access node comprises a mobile node.

10. The method of claim 1 wherein the donor access node comprises a mobile node.

11. A wireless communication network to serve wireless User Equipment (UEs) over Integrated Access and Backhaul (IAB), the wireless communication network comprising:
    an IAB Mobile Terminal (MT) configured to identify its geographic location and determine at least a New Radio Licensed (NR-L) frequency band and a New Radio Unlicensed (NR-U) frequency band based on the geographic location;
    the IAB MT configured to scan the NR-L frequency band and the NR-U frequency band and determine received signal strengths for the NR-L frequency band and the NR-U frequency band;
    the IAB MT configured to compare the received signal strengths for the NR-L frequency band and the NR-U frequency band and select the NR-U frequency band based on the comparison;
    the IAB MT configured to wirelessly exchange network signaling with a donor access node over the NR-U frequency band and establish an IAB link with the donor access node over the NR-U frequency band;
    a Radio Unit (RU) configured to wirelessly exchange user data with the wireless UEs and exchange the user data with a Distributed Unit (DU);
    the DU configured to exchange the user data with the RU and exchange the user data with the IAB MT; and
    the IAB MT configured to wirelessly exchange the user data with the donor access node over the IAB link using the NR-U frequency band.

12. The wireless communication network of claim 11 wherein the IAB MT comprises an IAB Backhaul Adaption Protocol (BAP) configured to compare the received signal strengths for the NR-L frequency band and the NR-U frequency band and select the NR-U frequency band based on the comparison to compare the received signal strengths for the NR-L frequency band and the NR-U frequency band and select the NR-U frequency band based on the comparison.

13. The wireless communication network of claim 11 wherein the IAB MT is configured to apply an NR-U offset to the received signal strength for the NR-U frequency band to compare the received signal strengths for the NR-L frequency band and the NR-U frequency band.

14. The wireless communication network of claim 11 wherein the IAB MT is configured to apply an NR-L offset to the received signal strength for the NR-L frequency band to compare the received signal strengths for the NR-L frequency band and the NR-U frequency band.

15. The wireless communication network of claim 11 further comprising:
the IAB MT configured to determine an interference level for the NR-U frequency band; and wherein
the IAB MT is configured to select the NR-U frequency band based on the comparison and the interference level for the NR-U frequency band to select the NR-U frequency band based on the comparison.

16. The wireless communication network of claim 11 wherein the Radio Unit (RU) is configured to wirelessly exchange the user data over another NR-U frequency band to wirelessly exchange the user data with the wireless UEs.

17. The wireless communication network of claim 11 wherein the Radio Unit (RU) is configured to wirelessly exchange the user data over another NR-L frequency band to wirelessly exchange the user data with the wireless UEs.

18. The wireless communication network of claim 11 wherein the wireless access node comprises a Fifth Generation New Radio (5GNR) gNodeB.

19. The wireless communication network of claim 11 wherein the wireless access node comprises a mobile node.

20. The wireless communication network of claim 11 wherein the donor access node comprises a mobile node.

* * * * *